US012592887B1

(12) United States Patent
Sharma et al.

(10) Patent No.: US 12,592,887 B1
(45) Date of Patent: Mar. 31, 2026

(54) PRIORITIZED MULTIPATH ACCESS TO CLOUD PLATFORM SUBNETS FROM AN SD-WAN BRANCH DEVICE

(71) Applicant: Cisco Technology, Inc., San Jose, CA (US)

(72) Inventors: Prem Shankar Sharma, San Jose, CA (US); Pradeep Kanavihalli Subramanyasetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 576 days.

(21) Appl. No.: 18/046,555

(22) Filed: Oct. 14, 2022

Related U.S. Application Data

(60) Provisional application No. 63/264,817, filed on Dec. 2, 2021.

(51) Int. Cl.
*H04L 45/76* (2022.01)
*H04L 45/02* (2022.01)

(52) U.S. Cl.
CPC .............. *H04L 45/76* (2022.05); *H04L 45/02* (2013.01)

(58) Field of Classification Search
CPC ................................ H04L 45/76; H04L 45/02
USPC ........................................................ 370/389
See application file for complete search history.

(56) References Cited

U.S. PATENT DOCUMENTS

| | | | |
|---|---|---|---|
| 10,855,660 | B1 * | 12/2020 | Gernhardt ........... H04L 63/0435 |
| 11,310,155 | B1 * | 4/2022 | Qian ..................... H04L 45/123 |
| 11,381,474 | B1 * | 7/2022 | Kumar ................ H04L 41/5009 |
| 11,546,219 | B1 * | 1/2023 | Groenewald ....... H04L 41/5051 |
| 11,546,245 | B2 * | 1/2023 | Pande .................. H04L 12/4641 |
| 11,595,347 | B1 * | 2/2023 | Shevade .............. H04W 36/13 |
| 11,784,924 | B2 * | 10/2023 | Thoria ................ H04L 12/4633 |
| | | | 370/392 |
| 12,126,526 | B2 * | 10/2024 | Vadde Makkalla ..... H04L 45/02 |
| 2020/0059370 | A1 | 2/2020 | Abraham |
| 2020/0059420 | A1 * | 2/2020 | Abraham ............ H04L 41/0843 |
| 2021/0126860 | A1 | 4/2021 | Ramaswamy |
| 2021/0168125 | A1 * | 6/2021 | Vemulpali ............. H04L 9/3236 |
| 2021/0194807 | A1 | 6/2021 | Jain et al. |
| 2021/0194825 | A1 * | 6/2021 | Goodman .............. G06F 16/29 |
| 2021/0328835 | A1 | 10/2021 | Mayya |
| 2022/0321469 | A1 * | 10/2022 | Qian ................... H04L 12/4633 |
| 2022/0321470 | A1 * | 10/2022 | Qian ...................... H04L 45/04 |
| 2022/0365835 | A1 * | 11/2022 | Kandasamy ........ G06F 11/0793 |
| 2023/0164059 | A1 * | 5/2023 | Dawani .................. H04L 45/22 |
| | | | 370/392 |
| 2024/0348530 | A1 * | 10/2024 | Mahadevan ............ H04L 45/22 |

* cited by examiner

*Primary Examiner* — Anthony Mejia
(74) *Attorney, Agent, or Firm* — Baker Botts L.L.P.

(57) ABSTRACT

A system and method for prioritized multipath access to cloud platform subnets from a software-defined wide-area network (SD-WAN) branch device. In one embodiment, a method includes determining routes to one or more virtual private cloud subnets hosted by a cloud service provider, prioritizing the routes based on one or more factors, and advertising the routes and route priorities over a Border Gateway Protocol session to one or more SD-WAN router appliances.

17 Claims, 5 Drawing Sheets

| Branch | Routes with proposed solution | Routes without proposed solution |
|---|---|---|
| Branch East | <ul><li>10.10.0.0/24 Priority 10 Via Router Appliance(s) in East region</li><li>10.10.0.0/24 Priority 1000 Via Router Appliance(s) in West region</li><li>20.20.0.0/24 Priority 1000 Via Router Appliance(s) in East region</li><li>20.20.0.0/24 Priority 10 Via Sdwan Router Appliance(s) in West region</li></ul> | <ul><li>10.10.0.0/24 Priority 10 Via Router Appliance(s) in East region</li><li>10.10.0.0/24 Priority 10 Via Router Appliance(s) in West region</li><li>20.20.0.0/24 Priority 10 Via Router Appliance(s) in East region</li><li>20.20.0.0/24 Priority 10 Via Router Appliance(s) in West region</li></ul> |
| Branch West | <ul><li>10.10.0.0/24 Priority 10 Via Router Appliance(s) in East region</li><li>10.10.0.0/24 Priority 1000 Via Router Appliance(s) in West region</li><li>20.20.0.0/24 Priority 1000 Via Router Appliance(s) in East region</li><li>20.20.0.0/24 Priority 10 Via Router Appliance(s) in West region</li></ul> | <ul><li>10.10.0.0/24 Priority 10 Via Router Appliance(s) in East region</li><li>10.10.0.0/24 Priority 10 Via Router Appliance(s) in West region</li><li>20.20.0.0/24 Priority 10 Via Router Appliance(s) in East region</li><li>20.20.0.0/24 Priority 10 Via Router Appliance(s) in West region</li></ul> |

PRIORITIZED MULTIPATH ACCESS TO CLOUD PLATFORM SUBNETS FROM AN SD-WAN BRANCH DEVICE

RELATED APPLICATION AND CLAIM TO PRIORITY

This application claims priority to U.S. Provisional Application No. 63/264,817 filed Dec. 2, 2021, and titled "Prioritized Multipath Access to GCP VPC Subnets from SDWAN Devices," which is incorporated herein by reference.

TECHNICAL FIELD

The present disclosure relates generally to a field of computer networks and, more particularly, to prioritized multipath access to cloud platform subnets from a software-defined wide-area network (SD-WAN) branch device.

BACKGROUND

A virtual private cloud may comprise regional subnets that are geographically far apart. Each regional subnet may have a corresponding regional cloud router, which advertises routes for the subnet to branch devices, which may then transmit and/or receive data along these advertised routes. In some cases, a cloud router of a first region may be paired with a virtual private cloud such that the cloud router may also advertise routes for a subnet in a second region. Conventional approaches for route advertisement may result in branch devices using routes that offer worse performance than other routes based on the routers through which the route passes.

BRIEF DESCRIPTION OF THE DRAWINGS

For a more complete understanding of the present disclosure and for further features and advantages thereof, reference is now made to the following description taken in conjunction with the accompanying drawings, in which:

FIG. 3 illustrates an example routing table that facilitates prioritized multipath access to cloud platform subnets from an SD-WAN branch device, according to some embodiments of the present disclosure;

DESCRIPTION OF EXAMPLE EMBODIMENTS

Overview

Figure 1:
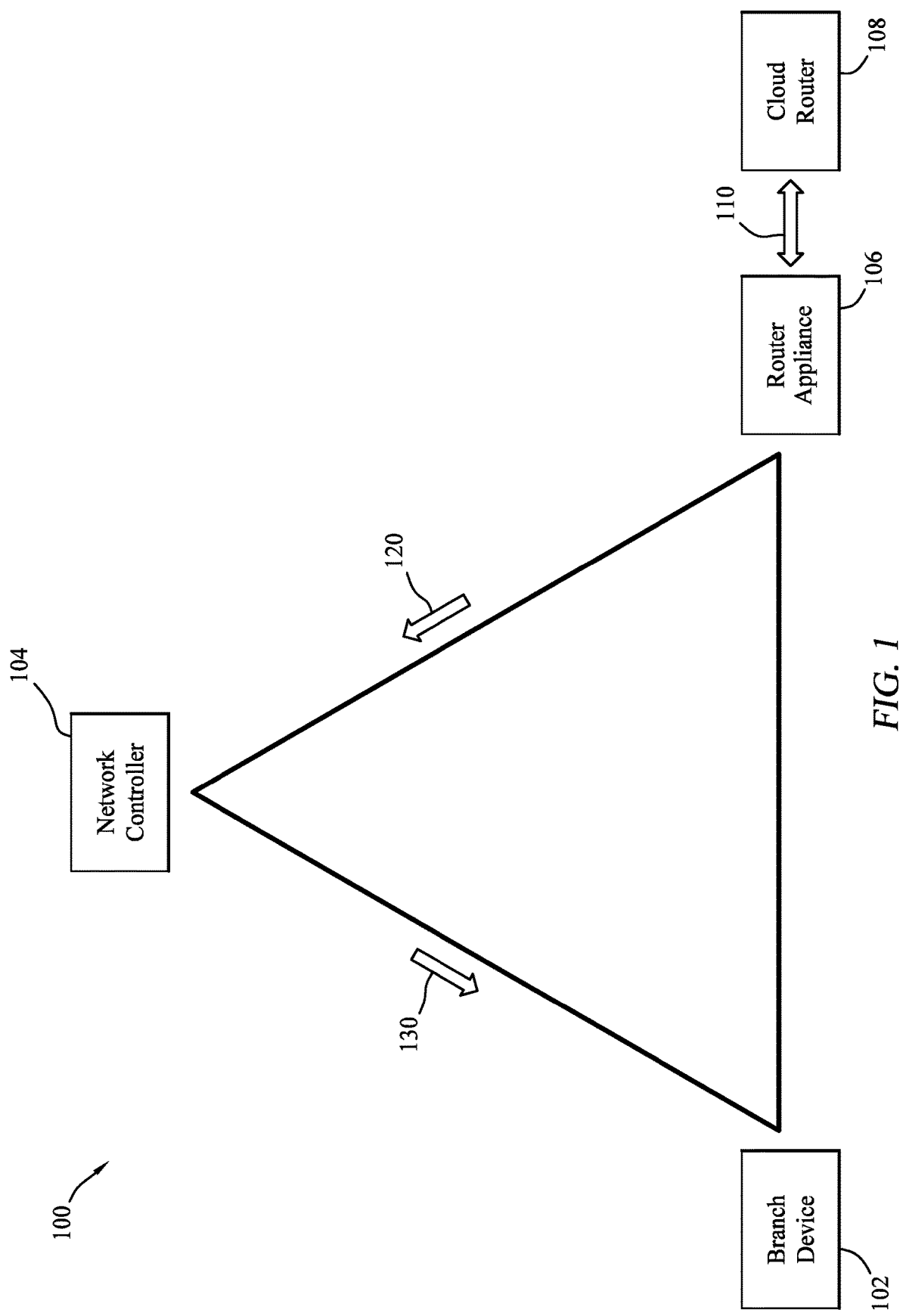
FIG. 1 illustrates an example computer network that provides prioritized multipath access to cloud platform subnets from a software-defined wide-area network (SD-WAN) branch device client device, according to some embodiments of the present disclosure.

Conventional approaches for advertising and selecting routes for transferring data between a client device and a regional subnet lead to inefficient routing, which reduces performance at the client device. Certain embodiments as described herein improve on these conventional approaches by advertising routes for regional subnets along with priority information. The priority information may indicate whether or not an advertised route passes to a regional subnet through a cloud router in the same region as the regional subnet. Accordingly, client devices may be able to determine routes that offer better performance by selecting routes based at least in part on the priority information associated with the routes.

According to an embodiment, a method includes determining routes to one or more virtual private cloud subnets hosted by a cloud service provider; prioritizing the routes based on one or more factors; and advertising, by the cloud router, the routes and route priorities over a Border Gateway Protocol session to one or more Software Defined Wide Area Network (SD-WAN) router appliances.

In certain embodiments, prioritizing the routes further includes prioritizing local-region routes over remote-region routes. In some embodiments, advertising the routes and route priorities further includes advertising local-region routes with lower Multi Exit Discriminator (MED) values than remote-region routes.

In certain embodiments, the method also includes communicating the prioritized routes to one or more branch devices in an SD-WAN domain that includes the one or more SD-WAN router appliances. In some cases, the one or more branch devices prioritize the use of routes with lower MED values.

In some embodiments, the method also includes building a prioritized, multipath SD-WAN routing table from the prioritized routes communicated across the SD-WAN domain. The prioritized, multipath SD-WAN routing table may include one or more of IP addresses, priority scores, and next hop information associated with the prioritized routes communicated across the SD-WAN domain.

According to other embodiments, a system includes one or more processors and one or more computer-readable non-transitory storage media. The one or more computer-readable non-transitory storage media include instructions that, when executed by the one or more processors, cause the system to perform operations including determining routes to one or more virtual private cloud subnets hosted by a cloud service provider; prioritizing the routes based on one or more factors; and advertising the routes and route priorities over a Border Gateway Protocol session to one or more SD-WAN router appliances.

According to yet another embodiment, one or more computer-readable non-transitory storage media embody instructions that, when executed by the processor, cause the processor to perform operations including determining routes to one or more virtual private cloud subnets hosted by a cloud service provider by the cloud router, the routes based on one or more factors; and advertising the routes and route priorities over a Border Gateway Protocol session to one or more SD-WAN router appliances.

Technical advantages of certain embodiments of this disclosure may include one or more of the following. A technical advantage of one embodiment may allow for improved performance of data transmissions between a branch device and a subnet by routing data transmissions to a subnet located in a certain region through cloud routers located in the same region as the subnet. Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
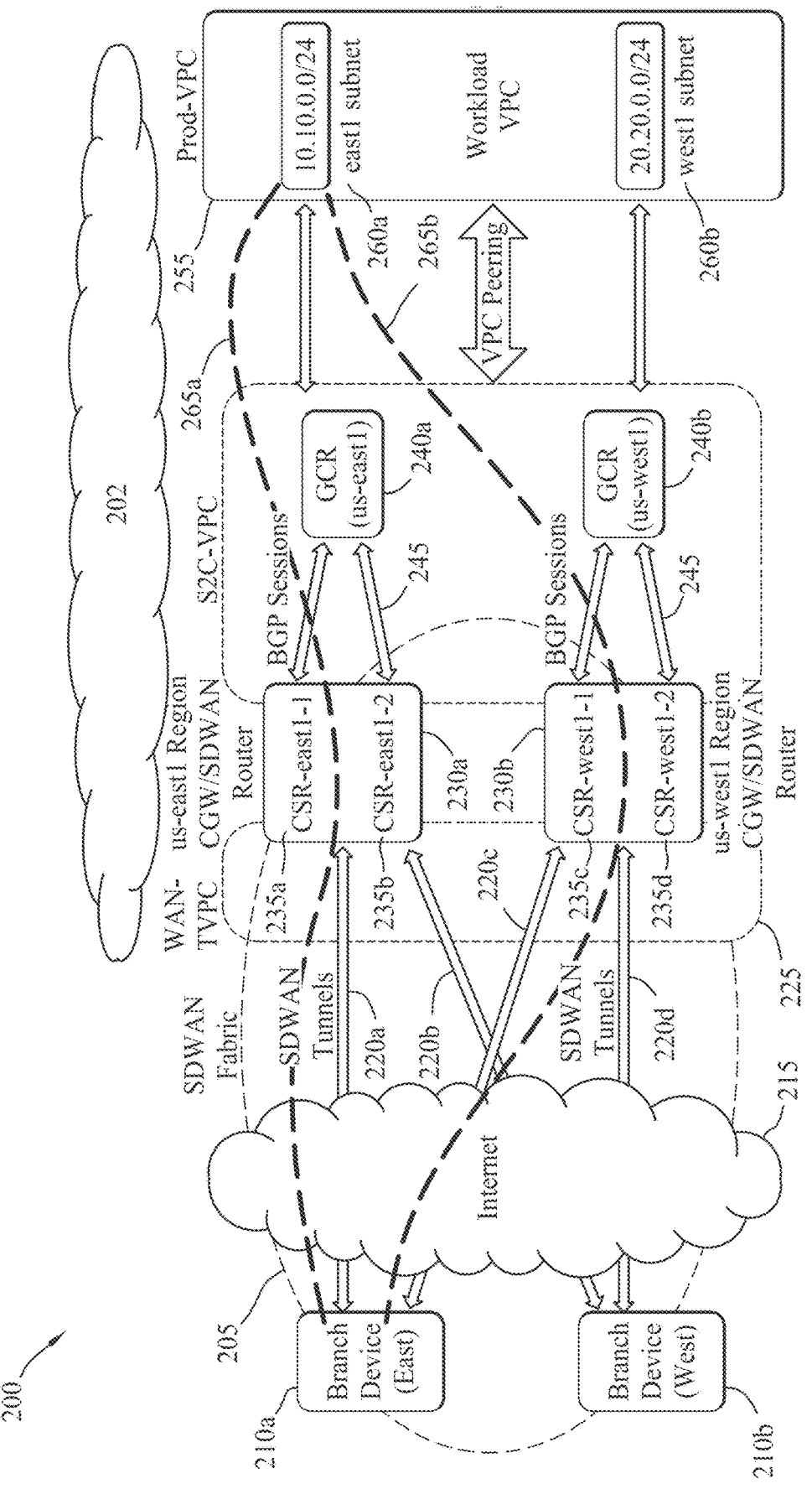
FIG. 2 illustrates an example computer network that provides prioritized multipath access to cloud platform subnets from an SD-WAN branch device, according to some embodiments of the present disclosure.
Figure 4:
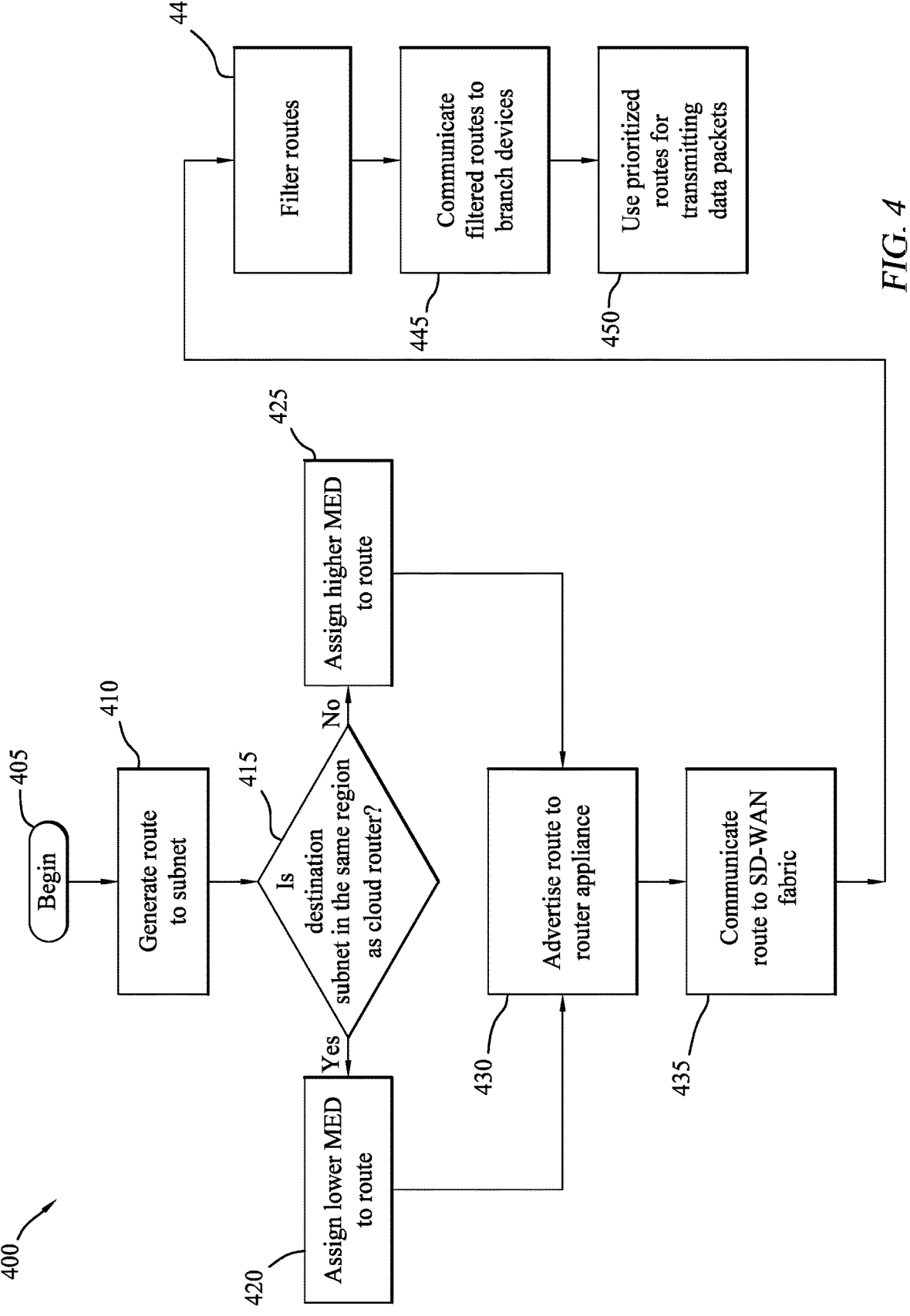
FIG. 4 illustrates an example method for prioritized multipath access to cloud platform subnets from an SD-WAN branch device, according to some embodiments of the present disclosure.
Figure 5:
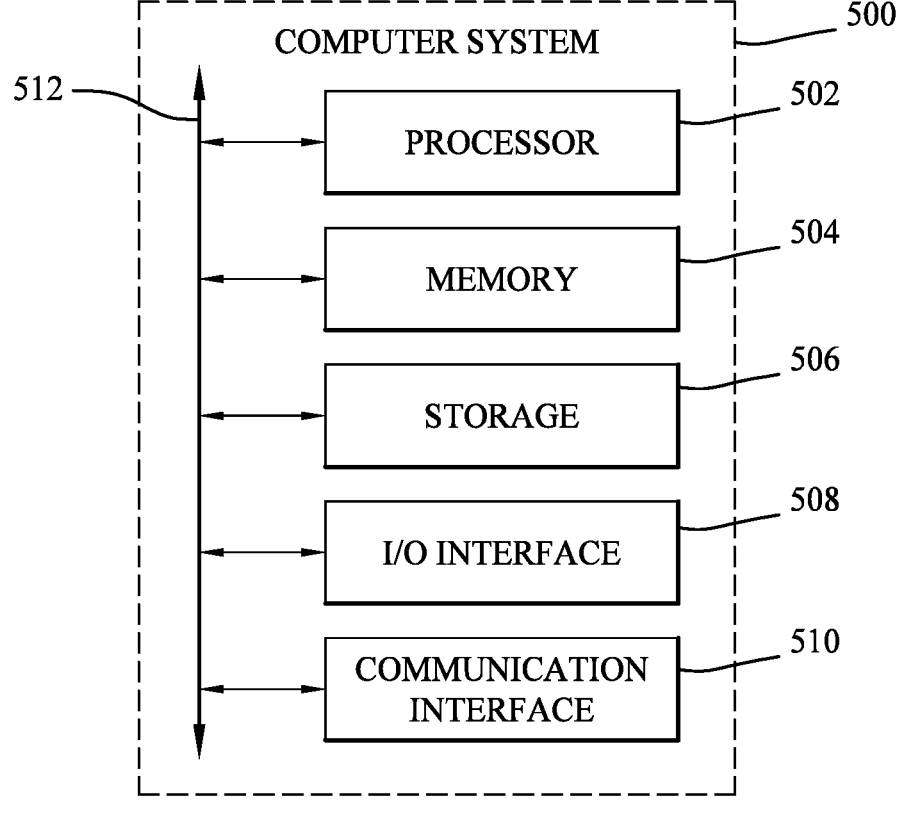
FIG. 5 illustrates an example of a computer system, according to some embodiments of the present disclosure.

This disclosure describes systems and methods for prioritized multipath access to cloud platform subnets from a software-defined wide-area network (SD-WAN) branch device. FIG. 1 illustrates an example computer network that provides prioritized multipath access to cloud platform subnets from an SD-WAN branch device, in accordance with certain embodiments. FIG. 2 illustrates an example computer network that provides prioritized multipath access to cloud platform subnets from an SD-WAN branch device, in accordance with certain embodiments. FIG. 3 illustrates an example routing table that facilitates prioritized multipath access to cloud platform subnets from an SD-WAN branch device, in accordance with certain embodiments. FIG. 4 illustrates an example method for prioritized multipath access to cloud platform subnets from an SD-WAN branch device, in accordance with certain embodiments. FIG. 5 illustrates an example of a computer system, in accordance with certain embodiments.

A client device may wish to use a workload located in a virtual private cloud (VPC) subnet. A VPC network is a virtual version of a physical network, and it is implemented inside a production network. A VPC network may include subnetworks, or subnets, that are regional in nature and associated with a range of Internet Protocol (IP) addresses. These addresses are advertised by cloud routers to other networks, such as an SD-WAN in which the client device may be located. A cloud router may too be regional in nature, and may correspond with a subnet such that the subnet and the cloud router are located in the same region. A branch device, such as a branch router, within the SD-WAN may receive the advertised routes and use the route information to route data packets between a client device and a particular subnet. In some cases, a cloud router may advertise routes to the subnet in the same region as the cloud router as well as routes to other subnets in different regions as the cloud router. Accordingly, the branch device may have access to all of the routes through which it may communicate with a subnet. In existing methods and systems for advertising and selecting routes through which data traffic may flow, there is no mechanism for conveying the regions associated with different routes or otherwise prioritizing routes based on the regions through which the routes pass. This can adversely affect the traffic flow performance over a network. For example, based on the routes it receives, a branch device may determine to route data traffic to a subnet in a first region through a cloud router in a second region, which offers worse traffic flow performance (e.g., by experiencing increased latency) than routing the data traffic to the subnet in the first region through a cloud router in the first region. Certain embodiments as described herein improve on these conventional approaches by advertising local-region subnets (i.e., the subnets belonging to the same region as that of the cloud router doing the advertising) with a higher priority compared to all other remote-region subnets (i.e., the subnets that do not belong to the same region as that of the cloud router doing the advertising). This may lead to regional cloud routers advertising local-region routes with a lower Multi-Exit Discriminator (MED) value compared to remote-region routes. These routes may be distributed within an SD-WAN domain and may be communicated to each SD-WAN device in the domain. The collection of such routes learned from different regions assists SD-WAN devices in building a prioritized, multipath SD-WAN routing table. SD-WAN devices then can apply policies to direct the traffic on these available paths, possibly preferring the use of local region paths over the others.

FIG. 1 is an illustration of an example network 100 that provides prioritized multipath access to cloud platform subnets from an SD-WAN branch device, according to particular embodiments. The components of network 100 may include any suitable combination of hardware, firmware, and software. For example, the components of network 100 may use one or more elements of the computer system of FIG. 5. In the illustrated embodiment, network 100 includes branch device 102, network controller 104, router appliance 106, and cloud router 108. Network 100 may comprise a virtual private cloud (VPC) that is provisioned and managed by a cloud provider. For example, network 100 may comprise the Google Cloud Platform™ (GCP) service. Network 100 may further comprise a software-defined wide-area network (SD-WAN), which may represent any suitable software overlay that runs over standard network transport services, such as the public Internet, multiprotocol public switching (MPLS), and broadband.

Branch device 102 represents any suitable device that is capable of facilitating communication between one or more client devices and one or more router appliances 106 in a computer network. Branch device 102 may include edge routers, access routers, branch routers, or the like. Branch device 102 may be interconnected to endpoints in a network by the public internet, an MPLS virtual private network (VPN), an SD-WAN, an SD-WAN overlay, a WAN, a local-area network (LAN), or the like. Branch device 102 may communicate to client devices and/or router appliance 106 through either wired or wireless connections. Branch device 102 may communicate via Border Gateway Protocol (BGP), Internet Protocol (IP), Transmission Control Protocol (TCP), User Datagram Protocol (UDP), or any suitable other networking protocol. In certain embodiments, branch device 102 receives routes to one or more subnets located in one or more regions from network controller 104. The routes may be differentiated based on priority. For example, network controller 104 may provide the branch devices with a prioritized list of routes. In some instances, two or more routes may be assigned the same priority. For example, two or more routes may be equal cost routes such that one equal cost route is not prioritized over the other equal cost route. In some embodiments, network controller 104 prioritizes the routes, and no further reprioritization occurs. The route information communicated from network controller 104 to branch device 102 may include a destination IP address, priorities, etc.

Network controller 104 represents any suitable device that facilitates building and maintaining a network topology and making decisions on where traffic flows in network 100. Network controller 104 may include one or more physical or virtual network controller appliances. Network controller 104 may include devices such as a physical or virtual Cisco® SD-WAN vSmart® controller. In some embodiments, network controller 104 may establish secure connections to each device in network 100 and distribute route and policy information via a control plane protocol. The control plane protocol may include Overlay Management Protocol (OMP), Open Shortest Path First (OSPF), Intermediate System to Intermediate System (IS-IS), BGP, Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc. In certain embodiments, network controller 104 is capable of communicating data traffic routes in network 100 to any device in network 100. In some embodiments, network controller 104 receives one or more routes from router appliance 106, and then filters the one or more routes based on one or more policies. For example, network controller 104 may process multiple routes with different priorities and determine which routes should be sent to branch device 102. Network controller 104 may then communicate the filtered routes to branch device 102 (see notation 130). The routes may include information such as destination IP addresses, priorities, and the like.

Router appliance 106 represents any suitable device that is capable of advertising routes for VPC subnets out to devices in other networks, such as network devices located in an SD-WAN. Router appliance 106 may further represent any suitable network device that facilitates communication between endpoints in a first network and endpoints in a second network. Router appliance 106 may include border routers and edge routers. Router appliance 106 may be interconnected to endpoints in each network by the public Internet, an MPLS VPN, an SD-WAN, or the like. In some embodiments, router appliance 106 represents any suitable network device that facilitates communication between end points in a first region of a network and a second region of a network. In some embodiments, router appliance 106 represents any suitable network device that facilitates communication between endpoints in a first network and a core network. In those embodiments, a core network may include an overlay management protocol (OMP) core network. Router appliance 106 may communicate via BGP. IP, TCP, UDP, or any other suitable networking protocol. In some embodiments, router appliance 106 connects and/or interfaces with cloud router 108. Router appliance 106 may learn the cloud routes as part of the programming at cloud router 108. Router appliance 106 may then communicate the routes to a network management system (e.g., Cisco® vManage management system). Network controller 104 (e.g., a Cisco® vSmart® controller) may be responsible for processing the routes. In certain embodiments, network controller 104 is more generally responsible for managing control and data policies. The external routes are learned by network controller 104, which may filter the routes based on one or more polices and communicate the filtered routes to branch device 102. In some examples, router appliance 106 may be referred to as a cloud gateway (CGW) or an SD-WAN router.

Cloud router 108 represents any suitable device that advertises routes for VPC subnets. Cloud router 108 may be interconnected to endpoints in a network by the public internet, an MPLS VPN, an SD-WAN, an SD-WAN overlay, a WAN, a LAN, or the like. Cloud router 108 may communicate to client devices and/or router appliance 106 through either wired or wireless connections. Cloud router 108 may communicate via BGP, IP, TCP, UDP, or any suitable other networking protocol.

In an example embodiment, router appliance 106 may communicate and/or interface with cloud router 108 (see notation 110) to receive routes for one or more subnets from cloud router 108. Router appliance 106 may then communicate the routes to network controller 104 (see notation 120). Upon receiving the routes from router appliance 106, network controller 104 filters the routes based on one or more policies. For example, network controller 104 may process multiple routes with different priorities and determine which routes should be sent to branch device 102. Network controller 104 may then communicate the filtered routes to branch device 102 (see notation 130). The routes may include information such as destination IP addresses, priorities, and the like. Branch device 102 then uses the prioritized routes received from network controller 104 to choose the best route to send a packet.

Although this disclosure describes and illustrates example systems and methods for providing prioritized multipath access to GCP VPC subnets from SD-WAN devices, this disclosure contemplates any suitable system or method for providing prioritized multipath access to subnets from client devices. Furthermore, although this disclosure describes and illustrates particular components, devices, or systems carrying out particular actions, this disclosure contemplates any suitable combination of any suitable components, devices, or systems carrying out any suitable actions. This same system may occur with any number of branch devices 102, network controllers 104, router appliances 106, and cloud routers 108. The network 100 is not limited to the number of exemplary components depicted in FIG. 1.

FIG. 2 illustrates an example network in greater detail, according to one embodiment. The components of network 200 may include any suitable combination of hardware, firmware, and software. For example, the components of network 200 may use one or more elements of the computer system of FIG. 5. In the illustrated embodiment, network 200 includes SD-WAN fabric 205, branch devices 210*a-b*, Internet 215, SD-WAN tunnels 220*a-d*, WAV-TVPC 225, router appliances 230*a-b*, CSRs 235*a-d*, cloud routers 240*a-b*, BGP sessions 245*a-d*, site-to-cloud (S2C) VPC 250, production VPC 255, subnets 260*a-b*, routes 265*a-b*, and cloud platform 202. Branch devices 210 may correspond to branch device 102 described above with reference to FIG. 1. Router appliances 230 may correspond to router appliance 106 described above with reference to FIG. 1. Cloud routers 240 may correspond to cloud router 108 described above with reference to FIG. 1.

SD-WAN fabric 205 represents any suitable software overlay that runs over standard network transport services, such as the public Internet, multiprotocol public switching (MPLS), and broadband. In some cases, SD-WAN fabric 205 may be referred to as an SD-WAN domain. For example, SD-WAN fabric 205 runs over the public Internet 215, which means that SD-WAN fabric 205 utilizes the network resources of the public Internet 215 to transmit data traffic between endpoints within SD-WAN fabric 205. Accordingly, SD-WAN fabric 205 may include one or more SD-WAN tunnels 220, such as SD-WAN tunnels 220*a-d*. SD-WAN tunnels 220 represent any suitable hardware and/or software that facilitates communication between components in SD-WAN fabric 205. SD-WAN tunnels 220 may use various IP-based communication protocols to carry data packets within network 200 including general packet radio service (GPRS) tunneling protocol (GTP), next generation application protocol (NGAP), UDP, real-time transport protocol (RTP), and transmission control protocol (TCP). SD-WAN tunnels 220 may include leased lines, Multiprotocol Label Switching (MPLS), IP Security (IPsec), VPN tunnels, fiber, T1 connections (e.g., bonded T1 connections), Digital Subscriber Line (DSL) (e.g., asymmetrical DSL, symmetrical DSL, high data rate DSL, very high data rate DSL, etc.), cable modems, dedicated internet access (DIA) circuits, ethernet circuits, Local Area Network (LAN) circuits, and the like. SD-WAN tunnels 220 may include point-to-point circuits, point-to-multipoint circuits, and/or multipoint-to-multipoint circuits. Branch devices 210 and router appliances 230 may communicate via SD-WAN tunnels 220. For example, branch device 210*a* may communicate with router appliance 230a via SD-WAN tunnel 220a; branch device 210a may communicate with router appliance 230b via SD-WAN tunnel 220b; branch device 210b may communicate with router appliance 230a via SD-WAN tunnel 220c; and branch device 210b may communicate with router appliance 230b via SD-WAN tunnel 220d.

In some embodiments, SD-WAN fabric 205 includes branch devices 210a and 210b. Branch devices 210 may correspond to branch device 102 described above with reference to FIG. 1. Branch devices 210a and 210b represent any suitable device that is capable of facilitating communication between one or more client devices and one or more endpoints of SD-WAN fabric 205, such as router appliances 230a and 230b. Branch devices 210a and 210b may each be associated with a respective branch of SD-WAN fabric 205. For example, branch device 210a may be associated with an cast branch of SD-WAN fabric 205, and branch device 210b may be associated with a west branch of SD-WAN fabric 205.

In some embodiments, SD-WAN fabric 205 includes router appliances 230a and 230b. Router appliances 230 may correspond to router appliance 106 as described above with reference to FIG. 1. Router appliances 230 may represent any suitable device that is capable of advertising routes for VPC subnets out to devices in other networks, such as network devices located in an SD-WAN. In some examples, a router appliance 230 may be referred to as a cloud gateway (CGW) or an SD-WAN router. Router appliances 230 may be associated with a branch of SD-WAN fabric 205. For example, router appliance 230a may be associated with an cast branch of SD-WAN fabric 205, and router appliance 230b may be associated with a west branch of SD-WAN fabric 205. Router appliances 230 may comprise one or more cloud services routers (CSRs) 235. Router appliances 230 may interface with SD-WAN tunnels 220 via a wide-area network (WAN) transit VPC (TVPC) 225, which may represent any suitable device or system that is capable of connecting geographically dispersed VPCs to each other and to remote networks (e.g., an SD-WAN).

CSRs 235 may represent any suitable device that is capable of advertising routes for VPC subnets out to devices in other networks, such as network devices located in an SD-WAN. CSRs 235 may further represent any suitable network device that facilitates communication between endpoints in a first network and endpoints in a second network. One or more CSRs 235 may be included in a router appliance 230. For example, router appliance 230a may include CSR 235a and CSR 235b, and router appliance 230b may include CSR 235c and CSR 235d.

Router appliances 230 and their associated CSRs 235 may communicate with cloud routers 240 via BGP sessions 245. Cloud routers 240 may correspond to cloud router 108 as described above with reference to FIG. 1. When a BGP session 245 is established between a cloud router 240, a router appliance 230, and/or a CSR 235, the cloud router 240 may be capable of advertising routes for VPC subnets to the router appliance 230 and/or the CSR 235. Cloud routers 240 may be located within site-to-cloud (S2C) VPC 250, which may represent any suitable system or device that is capable of connecting a VPC with a remote network (e.g., an SD-WAN). Cloud routers 240 may advertise routes for subnets 260 to router appliances 230.

Subnets 260 may be portions of production VPC 255. Production VPC 255 may be a virtual version of a physical network. VPC 255 may represent any suitable system or device capable of hosting and facilitating communications to one or more subnetworks (also referred to as subnets). For example, VPC 255 may include one or more subnets 260. Subnets 260 may be associated with a particular region of cloud platform 202. For example, subnet 260a may be associated with an cast region of cloud platform 202, and subnet 260b may be associated with a west region of cloud platform 202. Accordingly, subnets 260 may have different identifiers (e.g., IP addresses). For example, subnet 260a may have a first IP address (e.g., 10.10.0.0/24), and subnet 260b may have a second IP address (e.g., 20.20.0.0/24).

Cloud platform 202 may represent any suitable system, device, or architecture that is capable of providing cloud services such as computing, data storage, and data analytics. Cloud platform 202 may run on a physical network infrastructure that includes, for example, data centers and/or servers. In some examples, cloud platform 202 represents the Google Cloud Platform™ service (GCP).

In an embodiment, cloud routers 240 may be peered with production VPC 255 such that each cloud router 240 may learn the unique identifiers (e.g., the IP addresses) of each subnet 260 in production VPC 255. For example, cloud router 240a may determine the IP addresses of both subnet 260a (e.g., 10.10.0.0/24) and subnet 260b (e.g., 20.20.0.0/24); cloud router 240a may also determine the IP addresses of both subnet 260a (e.g., 10.10.0.0/24) and subnet 260b (e.g., 20.20.0.0/24). Each cloud router 240 may advertise these IP addresses to the router appliance 230 in the same region as the cloud router 240. For example, cloud router 240a may advertise the IP addresses to router appliance 230a because cloud router 240a and router appliance 230a are both in the cast region of cloud platform 202, and cloud router 240b may transmit the IP addresses to router appliance 230b because cloud router 240b and router appliance 230b are both in the west region of cloud platform 202. The advertised IP addresses may indicate routes to the respective subnets 260.

In some embodiments, a cloud router 240 may determine whether a subnet 260 is located in the same region as the cloud router 240. For example, when cloud routers 240 determine a respective IP address of a subnet 260, cloud routers 240 may further derive region information associated with the subnet 260. For example, when cloud router 240a determines subnet 260a's IP address, cloud router 240a may also determine region information associated with subnet 260a that indicates that subnet 260a is located in a first region (e.g., the cast region of cloud platform 202); when cloud router 240a determines subnet 260b's IP address, cloud router 240a may also determine region information associated with subnet 260b that indicates that subnet 260a is located in a second region (e.g., the west region of cloud platform 202). Similarly, when cloud router 240b determines subnet 260a's IP address, for example, cloud router 240b may also determine region information associated with subnet 260a that indicates that subnet 260a is located in a first region (e.g., the east region of cloud platform 202); when cloud router 240b determines subnet 260b's IP address, cloud router 240b may also determine region information associated with subnet 260b that indicates that subnet 260a is located in a second region (e.g., the west region of cloud platform 202).

Upon determining region information associated with a subnet 260, cloud routers 240 may assign a priority score to a route associated with the subnet 260 (e.g., the subnet 260's IP address). In some cases, a cloud router 240 may assign a high priority score to a route associated with a subnet 260 located in the same region as the cloud router 240 (i.e., a local-region route); a cloud router 240 may assign a low priority score to a route associated with a subnet 260 located in a different region as the cloud router 240 (i.e., a remote-region route). In some embodiments, priority scores may be reflected in the Multi Exit Discriminator (MED) value associated with a route, where a high-priority route (i.e., a local-region route) may be associated with a low MED value (e.g., 10) and a low-priority route (i.e., a remote-region route) may be associated with a high MED value (e.g., 1000).

For example, cloud router 240a may determine to assign a high priority score (e.g., an MED value of 10) to a route associated with subnet 260a (e.g., 10.10.0.0/24—subnet 260a's IP address) based at least in part on cloud router 240a and subnet 260a belonging to the same region of cloud platform 202 (e.g., the cast region). Cloud router 240a may determine to assign a low priority score (e.g., an MED value of 1000) to a route associated with subnet 260b based at least in part on cloud router 240a and subnet 260b belonging to different regions of cloud platform 202. Cloud router 240b may determine to assign a high priority score (e.g., an MED value of 10) to a route associated with subnet 260b based at least in part on cloud router 240b and subnet 260b belonging to the same region of cloud platform 202 (e.g., the west region). Cloud router 240b may determine to assign a low priority score (e.g., an MED value of 1000) to a route associated with subnet 260a based at least in part on cloud router 240b and subnet 260a belonging to different regions of cloud platform 202.

After determining the priority scores for routes associated with subnets 260, cloud routers 240 may advertise the priority scores, along with the respective routes, to router appliances 230. Upon receiving the routes to (e.g., the IP addresses of) subnets 260 along with the associated priority scores from cloud routers 240, router appliances 230 may forward the received routes and priority scores to devices within SD-WAN fabric 205 (e.g., branch devices 210 or a network manager), along with information identifying the router appliances 230 as next hops that can forward data traffic to a destination IP address. For example, router appliance 230a may transmit the route and priority score information associated with subnet 260a received from cloud router 240a (e.g., 10.10.0.0/24 and 10, respectively) and the route and priority score information associated with subnet 260b received from cloud router 240a (e.g., 20.20.0.0/24 and 1000, respectively) to both branch device 210a and branch device 210b. Router appliance 230a may further transmit information identifying router appliance 230a as a device that can be sent data traffic for a destination IP address and forward the data traffic to the destination IP address. Similarly, router appliance 230b may transmit the route and priority score information associated with subnet 260a received from cloud router 240b (e.g., 10.10.0.0/24 and 1000, respectively) and the route and priority score information associated with subnet 260b received from cloud router 240b (e.g., 20.20.0.0/24 and 10, respectively) to both branch device 210a and branch device 210b. Router appliance 230b may further transmit information identifying router appliance 230b as a device that can be sent data traffic for a destination IP address and forward the data traffic to the destination IP address. In some cases, branch devices 210 may determine that a router appliance 230 from which the branch devices 210 receive route and priority score information is a next hop along which data traffic can be forwarded. As such, branch device 210a and branch device 210b may each be configured with a plurality of routes (and associated priority scores) to each subnet 260.

For example, based on the information received from router appliance 230 and router appliance 230b, branch device 210a may be configured with two routes to subnet 260a (e.g., one passing through router appliance 230a (through either CSR 235a or CSR 235b) and the other passing through router appliance 230b (through either CSR 235c or CSR 235d)) and two routes to subnet 260b (e.g., one passing through router appliance 230a (through either CSR 235a or CSR 235b) and the other passing through router appliance 230b (through either CSR 235c or CSR 235d)). Similarly, branch device 210b may be configured with two routes to subnet 260a (e.g., one passing through router appliance 230a (through either CSR 235a or CSR 235b) and the other passing through router appliance 230b (through either CSR 235c or CSR 235d)) and two routes to subnet 260b (e.g., one passing through router appliance 230a (through either CSR 235a or CSR 235b) and the other passing through router appliance 230b (through either CSR 235c or CSR 235d)). Each of these routes may be associated with a priority score (e.g., 10 or 1000).

In some embodiments, a network controller (e.g., a network controller 104 as described above with reference to FIG. 1) within SD-WAN fabric 205 may receive the advertised routes, next hop information, and priority scores and filter this information before forwarding this information along to branch devices 210. As part of this filtering, the network controller may generate a routing table based at least in part on the advertised routes, next hop information, and priority scores. Each entry of a routing table may include a route that includes information associated with the IP address of the destination subnet 260, the identity of the router appliance 230 through which the route passes, and priority information associated with the route. The network controller may then forward the routing table to branch devices 210. In some cases, branch devices 210 may generate one or more routing tables based at least in part on the advertised routes, next hop information, and priority scores received from router appliances 230. FIG. 3, discussed in more detail below, illustrates an example routing table 300 that facilitates prioritized multipath access to cloud platform subnets from an SD-WAN branch device.

After it has received the plurality of routes to subnets 260a and 260b, a branch device 210 may receive data traffic intended for one subnet 260, resulting in the branch device 210 selecting a route along which it may forward the data traffic. For example, branch device 210a may receive data traffic intended for subnet 260a. Based on a routing table stored in branch device 210a, branch device 210a may know that it has at least two routes for transmitting this traffic: route 265a, which passes through router appliance 230a (through either CSR 235a or CSR 235b) and route 265b, which passes through router appliance 230b (through either CSR 235c or CSR 235d). Because route 265a is associated with a higher priority score (e.g., indicate by an MED value of 10), branch device 210a may determine to use route 265a to transmit the data traffic to subnet 260a.

If this prioritization information was not available, branch device 210a would be equally likely to select route 265a and route 265b when transmitting data traffic to subnet 260a. Accordingly, branch device 210a may choose to transmit the data traffic through route 265a (e.g., the route passing through router appliance 230a) in a first instance; in a second instance (e.g., when new data traffic intended for subnet 260a is received at branch device 210a), branch device 210a may choose to transmit the data traffic through route 265b (e.g., the route passing through router appliance 230b). Because branch device 210a could choose to transmit the data traffic intended for subnet 260a—which is located in a first region of cloud platform 202 (e.g., the cast region)— through a route that passes through router appliance 230*b*—which is located in a second region of cloud platform 202 (e.g., the west region)—branch device 210*a* may inadvertently select the route that offers lower performance given the different region locations of router appliance 230*b* and subnet 260*a* (and associated increased latency). The selection of a lower-performing route can be avoided by the disclosed system and method for including priority information in subnet route advertisements.

FIG. 3 illustrates an example routing table 300 that facilitates prioritized multipath access to cloud platform subnets from an SD-WAN branch device. As discussed above with reference to FIG. 2, routing table 300 may be generated by a branch device, or routing table 300 may be generated by a network controller located in an SD-WAN fabric and sent to a branch device. Routing table 300 may include one or more routes to destination subnets, which may comprise information associated with the IP address of the destination subnet, the identity of the router appliance through which the route passes, and priority information associated with the route. Routing table 300 may be stored in one or more branch devices (e.g., branch devices 210 as described above with reference to FIG. 2).

For example, a first entry in routing table 300 stored in a first branch device (e.g., a first branch device located in an cast region of a cloud platform and/or an SD-WAN fabric) may include the IP address of a first destination subnet (e.g., 10.10.0.0/24), a priority score (e.g., 10) and next hop information identifying a first router appliance (e.g., a router appliance in the cast region of the cloud platform and/or SD-WAN fabric). As discussed above with reference to FIG. 2, the priority score may be based on whether the first router appliance is located in the same region as the first destination subnet-a high priority score (which may be reflected by a low MED value, such as 10) may reflect that the first router appliance and the first destination subnet are located in the same region. A second entry in the routing table stored in the first branch device may include the IP address of the first destination subnet (e.g., 10.10.0.0/24), a priority score (e.g., 1000) and next hop information identifying a second router appliance (e.g., a router appliance in the west region of the cloud platform and/or SD-WAN fabric). As discussed above with reference to FIG. 2, a low priority score (which may be reflected by a high MED value, such as 1000) may reflect that the second router appliance and the first destination subnet are located in different regions. Accordingly, data traffic transmitted to the first destination subnet via the route associated with the second entry of routing table 300 may experience increased latency. Based on the priority information, the first branch device may choose to transmit data traffic intended for the first destination subnet via the route indicated by the first entry of routing table 300.

A third entry in routing table 300 stored in the first branch device may include the IP address of a second destination subnet (e.g., 20.20.0.0/24), a priority score (e.g., 1000) and next hop information identifying the first router appliance. As discussed above with reference to FIG. 2, this entry may indicate that the second destination subnet and the first router appliance are in different regions. A fourth entry in routing table 300 may include the IP address of the second destination subnet (e.g., 20.20.0.0/24), a priority score (e.g., 10) and next hop information identifying the second router appliance. As discussed above with reference to FIG. 2, this entry may indicate that the second destination subnet and the second router appliance are in the same region. Accordingly, data traffic transmitted to the second destination subnet via the route associated with the third entry of routing table 300 may experience increased latency. Based on the priority information, the first branch device may choose to transmit data traffic intended for the second destination subnet via the route indicated by the fourth entry of routing table 300.

Other branch devices (e.g., a second branch device located in a west region of the cloud platform and/or the SD-WAN fabric) may also be configured with routing table 300, and, based on the route entries and associated priority scores, determine routes along which data traffic intended for destination subnets is to be transmitted.

As discussed above with reference to FIG. 2, including priority scores that indicate whether a router appliance through which a route passes is located in the same region as a destination subnet allows the branch devices to prioritize a particular route amongst a plurality of routes to the same destination subnet. If such priority information is not included, for example, branch devices may be configured with the routing entries shown in the right-most column of routing table 300. Accordingly, a branch device may be equally likely in choosing between different routes to the same destination subnet, regardless of the performance of the routes (e.g., as indicated by latency).

FIG. 4 illustrates an example method for prioritized multipath access to cloud platform subnets from an SD-WAN branch device, according to some embodiments of the present disclosure. Method 400 begins at step 405. At step 410, cloud router 240 generates a route to a subnet 260. The route may include information associated with the subnet 260's IP address. At step 415, cloud router 240 determines whether the subnet 260 is located in the same region as the subnet 260. For example, cloud router 240 may be located in a first region of cloud platform 202 (e.g., the East region). When generating the route to the subnet 260, cloud router 240 may further determine region information associated with the subnet 260, and, based at least in part on this information, determine if cloud router 240 and the subnet 260 are located in the same region. If cloud router 240 and the subnet 260 are located in the same region, cloud router 240, at step 420 may assign a high priority score to the subnet 260. In some cases, a high priority score may comprise a low MED value (e.g., 10). If cloud router 240 and the subnet 260 are located in different regions, cloud router 240, at step 425, may assign a low priority score to the subnet 260. In some cases, a low priority score may comprise a high MED value (e.g., 1000).

At step 430, cloud router 240 may advertise the route, along with the priority information associated with the route, to router appliance 230. In some cases, cloud router 240 and router appliance 230 may be BGP peered such that cloud router 240 may advertise the route via a BGP session.

At step 435, router appliance 230 may communicate the route, along with the priority information associated with the route, to SD-WAN fabric 205. In some cases, this may comprise transmitting the route and priority information to a network controller (e.g., network controller 104). At step 440, the network controller may filter the route, along with any other routes receives from other router appliances 230, based on one or more factors. For example, the network controller may filter the routes according to priority scores, destination subnet IP address, or identity of the next device to which data traffic intended for the destination subnet may be forwarded. In some cases, filter the routes may comprise generating a routing table, the entries of which include information associated with one or more routes, the next hops within the one or more routes, and priority scores associated with the one or more routes.

At step 445, the network controller may communicate the filtered routes to one or more branch devices 210. In some cases, branch devices 210 may receive the route information, priority scores, and next hop information directly from router appliance 230. In such cases, branch devices 210 may perform step 440, including filtering the routes (e.g., generating a routing table). At step 450, the branch devices 210 may select routes for transmitting data traffic to a destination subnet based at least in part on the filtered route information. For example, a branch device 210 may choose the route to a destination subnet 260 with the highest associated priority score (e.g., the route with the lowest MED value).

Various embodiments may perform some, all, or none of the steps described above. Furthermore, certain embodiments may perform these steps in a different order or in parallel. While discussed as branch device 210, router appliance 230, and cloud router 240 as performing the steps of this method, any suitable component of network 100 may perform one or more steps of the method.

FIG. 5 illustrates an example of a computer system, in accordance with certain embodiments. In particular embodiments, one or more computer systems 500 provide functionality described or illustrated herein. As an example, one or more computer systems 500 may be used to provide at least a portion of a branch device 102, network controller 104, router appliance 106, or cloud router 108 described with respect to FIG. 1. As an example, one or more computer systems 500 may be used to provide at least a portion of a branch device 210, router appliance 230, CSR 235, or cloud router 240 described with respect to FIG. 2. As yet another example, one or more computer systems 500 may be used to perform one or more steps described with respect to FIG. 4. In particular embodiments, software running on one or more computer systems 500 provides functionality described or illustrated herein or performs one or more steps of one or more methods described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory manage-ment units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be inter-nal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating com-munication between processor 502 and storage 506, where appropriate. Where appropriate, storage 506 may include one or more storages 506. Although this disclosure describes and illustrates particular storage, this disclosure contem-plates any suitable storage.

In particular embodiments, I/O interface 508 includes hardware, software, or both, providing one or more inter-faces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illus-trates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network inter-face controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable com-munication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication inter-face, this disclosure contemplates any suitable communica-tion interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Stan-dard Architecture (ISA) bus, an INFINIBAND interconnect, a low-pin-count (LPC) bus, a memory bus, a Micro Channel Architecture (MCA) bus, a Peripheral Component Intercon-nect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or appli-cation-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-vola-tile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A method, comprising:
determining a route to a virtual private cloud subnet hosted by a cloud service provider;
determining a region associated with the virtual private cloud subnet;
determining a route priority based on the determined region; and
advertising the route and the route priority over a Border Gateway Protocol session to one or more Software Defined Wide Area Network (SD-WAN) router appliances, wherein advertising the route and the route priority further comprises advertising a local-region route with a lower Multi Exit Discriminator (MED) value than a remote-region route.

2. The method of claim 1, wherein determining the route priority further comprises prioritizing a local-region route over a remote-region route.

3. The method of claim 1, further comprising:
communicating the route and the route priority to one or more branch devices in an SD-WAN domain that includes the one or more SD-WAN router appliances.

4. The method of claim 3, wherein the one or more branch devices prioritize use of a route associated with a lower MED value than one or more other routes.

5. The method of claim 1, further comprising:
building a prioritized, multipath SD-WAN routing table from the route and the route priority communicated across an SD-WAN domain.

6. The method of claim 5, wherein the prioritized, multipath SD-WAN routing table comprises one or more of IP addresses, priority scores, and next hop information associated with the route communicated across the SD-WAN domain.

7. A system, comprising:
one or more processors; and
one or more computer-readable non-transitory storage media comprising instructions that, when executed by the one or more processors, cause one or more components of the system to perform operations comprising:
determining a route to a virtual private cloud subnet hosted by a cloud service provider;
determining a region associated with the virtual private cloud subnet;
determining a route priority based on the determined region; and
advertising the route and the route priority over a Border Gateway Protocol session to one or more Software Defined Wide Area Network (SD-WAN) router appliances, wherein advertising the route and the route priority further comprises advertising a local-region route with a lower Multi Exit Discriminator (MED) value than a remote-region route.

8. The system of claim 7, wherein determining the route priority further comprises prioritizing a local-region route over a remote-region route.

9. The system of claim 7, further comprising:

communicating the route and the route priority to one or more branch devices in an SD-WAN domain that includes the one or more SD-WAN router appliances.

10. The system of claim 9, wherein the one or more branch devices prioritize use of a route associated with a lower MED value than one or more other routes.

11. The system of claim 7, further comprising:

building a prioritized, multipath SD-WAN routing table from the route and the route priority communicated across an SD-WAN domain.

12. The system of claim 11, wherein the prioritized, multipath SD-WAN routing table comprises one or more of IP addresses, priority scores, and next hop information associated with the route communicated across the SD-WAN domain.

13. One or more computer-readable non-transitory storage media embodying instructions that, when executed by a processor, cause performance of operations comprising:

determining a route to a virtual private cloud subnet hosted by a cloud service provider;

determining a region associated with the virtual private cloud subnet;

determining a route priority based on the determined region; and advertising the route and the route priority over a Border Gateway Protocol session to one or more Software Defined Wide Area Network (SD-WAN) router appliances, wherein advertising the route and the route priority further comprises advertising a local-region route with a lower Multi Exit Discriminator (MED) value than a remote-region route.

14. The one or more computer-readable non-transitory storage media of claim 13, wherein determining the route priority further comprises prioritizing a local-region route over a remote-region route.

15. The one or more computer-readable non-transitory storage media of claim 13, the operations further comprising:

communicating the route and the route priority to one or more branch devices in an SD-WAN domain that includes the one or more SD-WAN router appliances.

16. The one or more computer-readable non-transitory storage media of claim 15, wherein the one or more branch devices prioritize use of a route associated with a lower MED value than one or more other routes.

17. The one or more computer-readable non-transitory storage media of claim 13, the operations further comprising:

building a prioritized, multipath SD-WAN routing table from the route and the route priority communicated across an SD-WAN domain.

* * * * *